US011418387B2

(12) United States Patent
Rendlen et al.

(10) Patent No.: US 11,418,387 B2
(45) Date of Patent: Aug. 16, 2022

(54) SYSTEMS AND METHODS FOR OPTICAL DEVICE CONFIGURATION (71) Applicants: Jeffrey R. Rendlen, Chicago, IL (US); Spencer Neilan, Chicago, IL (US)

(72) Inventors: Jeffrey R. Rendlen, Chicago, IL (US); Spencer Neilan, Chicago, IL (US)

(73) Assignee: SHOPPERTRAK RCT CORPORATION, Chicago, IL (US)

( * ) Notice: Subject to any disclaimer, the term of this patent is extended or adjusted under 35 U.S.C. 154(b) by 22 days.

(21) Appl. No.: 16/288,496

(22) Filed: Feb. 28, 2019

(65) Prior Publication Data
US 2020/0280487 A1 Sep. 3, 2020

(51) Int. Cl.
H04L 41/0806 (2022.01)
H04L 41/0813 (2022.01)
H04L 41/22 (2022.01)

(52) U.S. Cl.
CPC ...... H04L 41/0806 (2013.01); H04L 41/0813 (2013.01); H04L 41/22 (2013.01)

(58) Field of Classification Search
CPC . H04L 41/0806; H04L 41/0813; H04L 41/22; G08B 13/19669; G08B 25/008; G08B 26/00
USPC ......................................................... 709/220
See application file for complete search history.

(56) References Cited

U.S. PATENT DOCUMENTS

| | | | | |
|---|---|---|---|---|
| 9,247,219 | B2* | 1/2016 | Kasmir | H04N 7/188 |
| 9,402,281 | B1* | 7/2016 | Fiennes | H04L 12/12 |
| 10,321,310 | B1* | 6/2019 | Scheer | H04L 63/061 |
| 10,579,839 | B1* | 3/2020 | Johansson | H04B 5/0031 |
| 10,593,174 | B1* | 3/2020 | Yoon | H04L 12/2816 |
| 2007/0051813 | A1* | 3/2007 | Kiuchi | G06K 7/14 235/462.1 |
| 2008/0250122 | A1* | 10/2008 | Zsigmond | H04L 63/083 709/220 |
| 2010/0235433 | A1* | 9/2010 | Ansari | G06F 16/68 709/203 |
| 2010/0306418 | A1* | 12/2010 | Anson | G06F 9/4411 710/8 |
| 2014/0372574 | A1* | 12/2014 | Valdivia | H04L 41/0846 709/220 |
| 2015/0106755 | A1* | 4/2015 | Moore | G06F 3/04883 715/765 |

(Continued)

Primary Examiner — Tauqir Hussain
(74) Attorney, Agent, or Firm — ArentFox Schiff LLP (57) ABSTRACT Systems and methods for optical device configuration. The methods comprise: receiving, by a mobile device, network configuration data for an electronic device that is at least partially out of reach to individuals without use of a climbable object, has an optical input device, and needs to have a network connection established; outputting from the mobile device a first visible sequence representing an activation code; receiving the activation code at the electronic device via the optical input device; performing operations by the electronic device to transition an operational mode to a configuration mode in response to the activation code; outputting from the mobile device a second visible sequence representing network configuration data for the electronic device; receiving the network configuration data at the electronic device via the optical input device; and modifying, by the electronic device, network settings in accordance with the network configuration data.

21 Claims, 7 Drawing Sheets (56) References Cited

U.S. PATENT DOCUMENTS

| | | | |
|---|---|---|---|
| 2015/0193765 A1* | 7/2015 | Gadotti | G06Q 20/3278 |
| | | | 705/39 |
| 2015/0199552 A1* | 7/2015 | Du | G06F 21/32 |
| | | | 382/124 |
| 2016/0125246 A1* | 5/2016 | Ryhorchuk | H04N 7/181 |
| | | | 348/143 |
| 2017/0097499 A1* | 4/2017 | Cheng | G02B 13/006 |
| 2017/0150581 A1* | 5/2017 | Wagoner | H04B 10/116 |
| 2019/0295390 A1* | 9/2019 | Ewing | G08B 13/2448 |
| 2020/0015050 A1* | 1/2020 | Moner Poy | G06K 7/10722 |
| 2020/0074639 A1* | 3/2020 | Zhao | G06V 20/56 |
| 2021/0221368 A1* | 7/2021 | Lavi | B60W 30/162 |
| 2022/0085626 A1* | 3/2022 | Singh | B60L 53/665 |

\* cited by examiner

SYSTEMS AND METHODS FOR OPTICAL DEVICE CONFIGURATION

BACKGROUND

Statement of the Technical Field

The present disclosure relates generally to systems comprising optical input devices. More particularly, the present disclosure relates to implementing systems and methods for optical device configuration.

Description of the Related Art

Some conventional systems comprise electronic devices that are mounted out of reach. These electronic devices comprise wired communication equipment that needs to be configured for sending and receiving information via a network (e.g., an Intranet or Internet). The interfaces of the wired communication equipment are inaccessible. Therefore, great effort and a relatively large amount of time is required by technicians to provision and/or re-provision the wired communications equipment.

SUMMARY

The present document concerns implementing systems and methods for optical device configuration. The methods comprise: receiving, by a mobile device, network configuration data for an electronic device (e.g., a traffic monitoring system) that is at least partially out of reach to individuals without use of a climbable object, has an optical input device, and needs to have a network connection established; outputting from the mobile device a first visible sequence representing an activation code and/or a mobile device identifier; receiving the activation code and/or mobile device identifier at the electronic device via the optical input device; performing operations by the electronic device to transition an operational mode to a configuration mode in response to the activation code and/or a mobile device identifier; outputting from the mobile device a second visible sequence representing network configuration data for the electronic device; receiving the network configuration data at the electronic device via the optical input device; modifying, by the electronic device, network settings in accordance with the network configuration data; attempting to establish a network connection by the electronic device using the modified network settings; and/or providing a notification indicating whether the network connection was successfully established by the electronic device. The first visible sequence and/or second visible sequence comprise at least one of a flash sequence or a display pattern sequence.

The optical input device may comprise a camera. In this case, the method further comprises: capturing by the camera first images or video of the first visible sequence and second images or video of the second visible sequences; and performing image or video analysis to obtain the activation code from the first captured images or video and to obtain the network configuration data from the second images or video. The image or video analysis involves translating from one or more symbol coding schemes to textual information, numerical information and/or symbolic information.

In some scenarios, the implementing systems can comprises a processor; and a non-transitory computer-readable storage medium comprising programming instructions that are configured to cause the processor to implement a method for optical device configuration. The programming instructions comprise instructions to cause a mobile device to: receive network configuration data for an electronic device (e.g., a traffic monitoring system) that is at least partially out of reach to individuals without use of a climbable object, has an optical input device, and needs to have a network connection established; output a first visible sequence representing a mobile device identifier and/or an activation code for causing the electronic device to transition an operational mode to a configuration mode; and output a second visible sequence representing network configuration data based on which network settings of the electronic device are to be modified.

The modified network settings are used by the electronic device to attempt to establish a network connection. Accordingly, the programming instructions further comprise instructions to cause the second visible sequence to be output once again when the network connection is not successfully established by the electronic device.

In those or other scenarios, the implementing systems comprises: a processor; and a non-transitory computer-readable storage medium comprising programming instructions that are configured to cause the processor to implement a method for optical device configuration associated with an electronic device that is at least partially out of reach to individuals without use of a climbable object, has an optical input device and needs to have a network connection established. The programming instructions comprise instructions to cause the electronic device to: receive a first visible sequence representing an activation code via the optical input device; transition an operational mode to a configuration mode in response to the activation code; receive a second visible sequence representing network configuration data via the optical input device; modify network settings in accordance with the network configuration data; attempt to establish the network connection in accordance with the modified network settings; and/or provide a notification indicating whether or not the network connection was successfully established.

The optical input device may comprises a camera. In this case, the programming instructions further comprise instructions to: capture first images or video of the first visible sequence and second images or video of the second visible sequences; and perform image or video analysis to obtain the activation code from the first captured images or video and to obtain the network configuration data from the second images or video. The image or video analysis comprises translating from one or more symbol coding schemes to textual information, numerical information and/or symbolic information.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above in the background section of this document, great effort and a relatively large amount of time is required by technicians to provision and/or re-provision the wired communications equipment. The present solution reduces the amount of time and effort needed to provision and/or re-provision wired communications equipment that is out of reach and/or inaccessible, as well as simplifies the provisioning and/or re-provisioning process such that people other than technicians can perform the same without great effort. In this regard, the present solution generally provides implementing systems and methods for device provisioning using an optical means (e.g., a camera provided with the wired communications equipment and a flash or display provided with a mobile device such as a smart phone).

The present solution generally involves: receiving, by a mobile device, network configuration data for an electronic device (e.g., a traffic monitoring system) that is at least partially out of reach to individuals without use of a climbable object, has an optical input device, and needs to have a network connection established; outputting from the mobile device a first visible sequence representing an activation code and/or a mobile device identifier; receiving the activation code and/or mobile device identifier at the electronic device via the optical input device; performing operations by the electronic device to transition an operational mode to a configuration mode in response to the activation code and/or a mobile device identifier; outputting from the mobile device a second visible sequence representing network configuration data for the electronic device; receiving the network configuration data at the electronic device via the optical input device; modifying, by the electronic device, network settings in accordance with the network configuration data; attempting to establish a network connection by the electronic device using the modified network settings; and/or providing a notification indicating whether the network connection was successfully established by the electronic device. The first visible sequence and/or second visible sequence comprise at least one of a flash sequence or a display pattern sequence.

The optical input device may comprise a camera. In this case, the present solution further comprises: capturing by the camera first images or video of the first visible sequence and second images or video of the second visible sequences; and performing image or video analysis to obtain the activation code from the first captured images or video and to obtain the network configuration data from the second images or video. The image or video analysis involves translating from one or more symbol coding schemes to textual information, numerical information and/or symbolic information.

Figure 1:
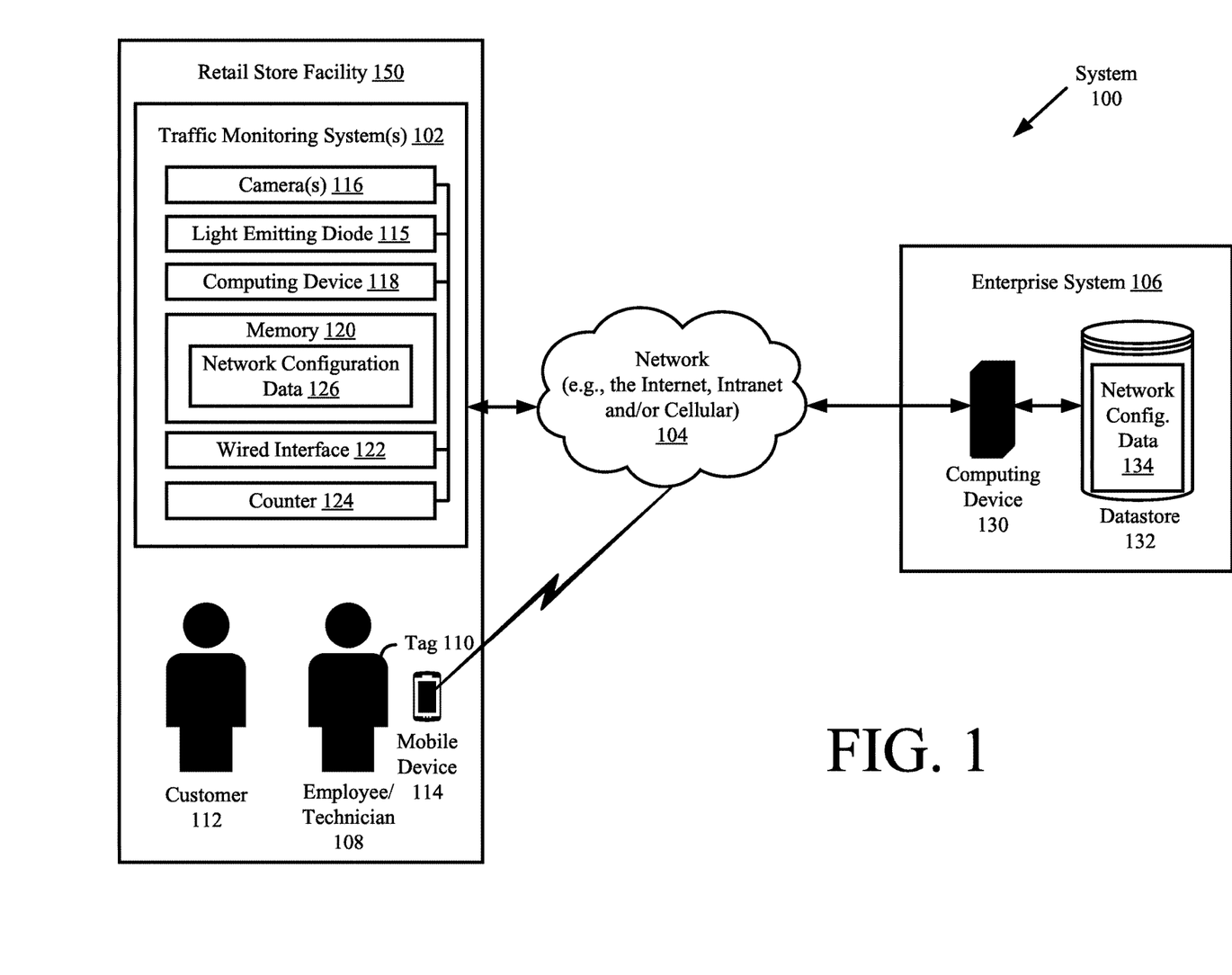
FIG. 1 is an illustration of an illustrative system.

Referring now to FIG. 1, there is provided an illustration of an illustrative system 100 implementing the present solution. The present solution will be described herein in relation to a retail store application. However, the present solution is not limited in this regard. The present solution can be used with any system that is (a) at least partially out of reach, (b) has an optical input device, (c) has a wired interface that is inaccessible, and/or (d) needs to have a network connection established.

As shown in FIG. 1, system 100 comprises a Retail Store Facility ("RSF") 150 and an enterprise system 106 that is remote from the RSF. The RSF 150 comprises one or more traffic monitoring systems 102 located in proximity to entry ways and/or pass-throughs. The traffic monitoring systems 102 are mounted to walls and/or ceilings so as to be out of reach to employees 108 and customers 112 without use of a ladder or other climbable object. In some scenarios, each traffic monitoring system 102 comprises a traffic counting device called Orbit which is available from Shoppertak of Chicago, Ill. The present solution is not limited in this regard.

The traffic monitoring system(s) 102 is(are) generally configured to measure traffic in the RSF 150. The traffic measurements are used to identify times when traffic peaks, to determine an accurate rate of conversion, to optimize resource allocation, and/or to determine a marketing campaigns performance. The traffic measurements are achieved using image processing. In this regard, the traffic monitoring system 102 comprises an optical input device. The optical input device includes, but is not limited to, a camera 116 or other photo sensor. The camera 116 has a Field Of View ("FOV") that covers a portion of or an entire entry way or pass-through. The camera 116 captures images and/or videos continuously and/or in response to trigger events (e.g., the detection of motion in its FOV). The captured images and/or videos are stored in a local memory 120 and/or a remote datastore 132. The captured images and/or videos are processed by computing device 118 and/or computing device 130 to detect people therein. Techniques for detecting, recognizing and/or identifying people in images/videos are well known in the art, and therefore will not be described herein. Any known or to be known technique for detecting, recognizing and/or identifying people in images/videos can be used herein without limitation.

A counter 124 is incremented when a person is detected in a captured image or video. The counter 124 is shown as being located at the RSF 150. The counter could alternatively be located at the enterprise system 106. Also, the counter can be part of the computing device 118 and/or computing device 130. In some scenarios, the processing device 118 is able to distinguish people from each other and to track whether each person has or has not been counted. In this way, the counter 124 may be incremented only when a new person (i.e., a person who has not been previously counted in a given period of time) is detected in the RSF 150. The counter value provides a measure of traffic in the RSF 150.

As shown in FIG. 1, the network connection is established between the traffic monitoring system 102 and the enterprise system 106 via a network 104 such as the Internet or an Intranet. The network connection establishment is achieved in accordance with the present solution, i.e., via a hands-off, remote setting programming, configuration and/or provisioning process without use of on-site WiFi or any other wireless communication technology. In this regard, the traffic monitoring system 102 is programed or configured remotely by an employee, technician or other person 108 on-site using a mobile device 114. The mobile device 114 can include, but is not limited to, a mobile phone, a smart phone, a tablet, a camera, and/or any other device with a flash and/or display.

During the programming/configuration/provisioning process, the mobile device 114 communicates with the enterprise system 106 to obtain network configuration data 134 therefrom. The network configuration data 134 is communicated from the computing device 130 to the mobile device 114 via a network 104 (e.g., the Internet, Intranet or cellular network) as part of an electronic message (e.g., a text message and/or an electronic mail message with or without a link to a website). The network configuration data 134 can include, but is not limited to, network addresses, network port numbers, or any other protocol setting that is needed for establishing a network connection between at least two remote devices. The protocol can include, but is not limited to, Internet Protocol ("IP"), an Ethernet protocol, and/or a Power over Ethernet ("PoE") protocol.

Once the network configuration data 134 is received by the mobile device 114, a notification is provided to the user 108 thereof. The user 108 is then instructed to place the mobile device 114 in the FOV of the traffic monitoring systems camera 116. A widget for initiating a programming, configuration and/or provisioning process is also presented to the user of the mobile device 114. The widget can include, but is not limited to, a virtual push button.

The mobile device 114 performs the programming, configuration and/or provisioning process in response to its reception of a user-software interaction facilitated by the widget.

The programming, configuration and/or provisioning process generally involves communicating at least a portion of the network configuration data 134 to the traffic monitoring system 102 via a sequence of flashes or a sequence of high-contrast display patterns (e.g., black, white and/or red display patterns, or grayscale patterns), as described below.

Figure 2:
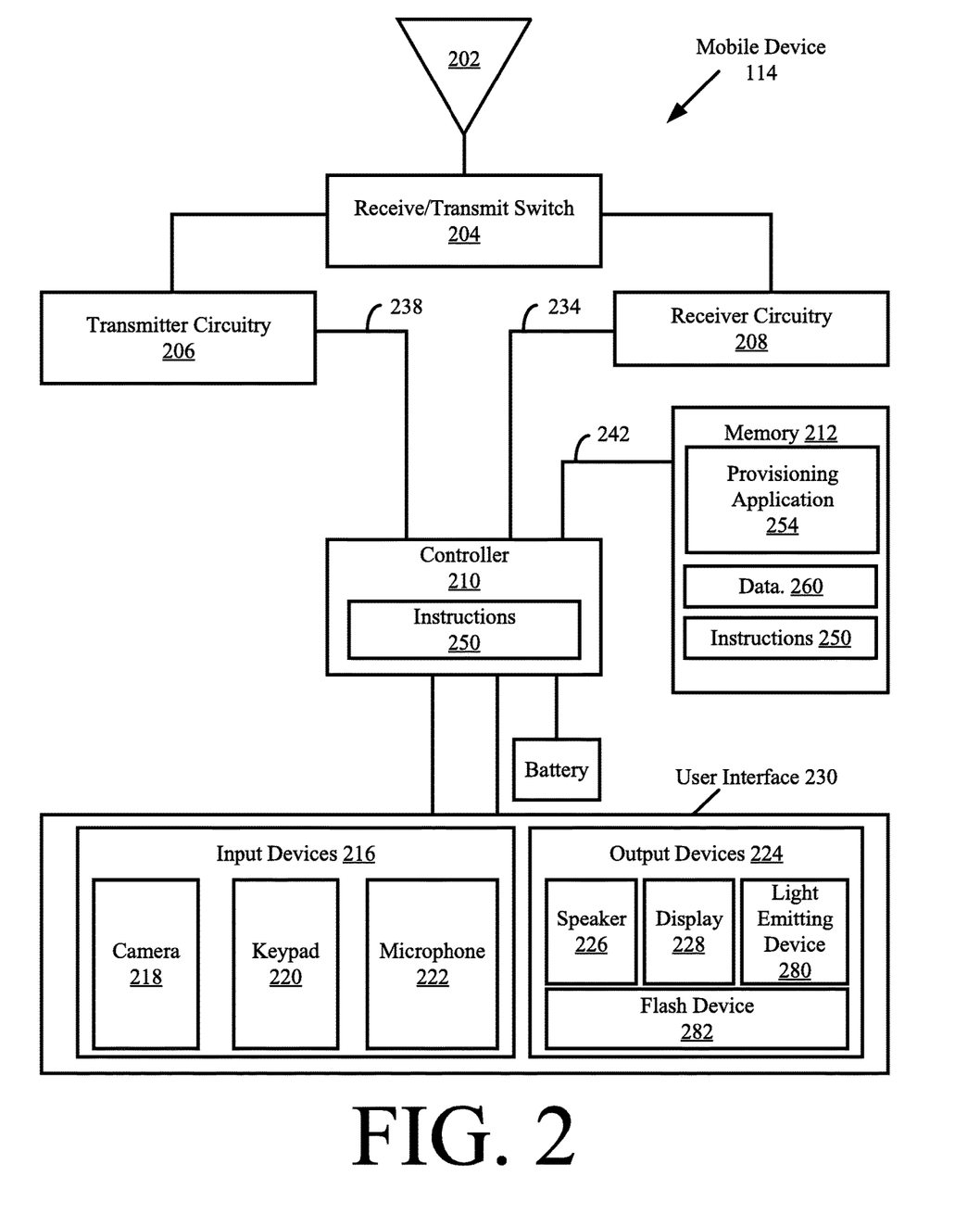
FIG. 2 is an illustration showing an illustrative architecture for a mobile device.

Referring now to FIG. 2, there is provided an illustration of an illustrative architecture for the mobile device 114. Mobile device 114 may include more or less components than those shown in FIG. 2. However, the components shown are sufficient to disclose an illustrative embodiment implementing the present solution. Some or all of the components of the mobile device 114 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As noted above, the mobile device 114 can include, but is not limited to, a notebook computer, a personal digital assistant, a tablet, a cellular phone or a mobile phone with smart device functionality (e.g., a Smartphone). In this regard, the mobile device 114 comprises an antenna 202 for receiving and transmitting Radio Frequency ("RF") signals. A receive/transmit ("Rx/Tx") switch 204 selectively couples the antenna 202 to the transmitter circuitry 206 and the receiver circuitry 208 in a manner familiar to those skilled in the art. The receiver circuitry 208 demodulates and decodes the RF signals received from an external device. The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the mobile device 114. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device via the Rx/Tx switch 204.

The controller 210 may store received and extracted information in memory 212 of the mobile device 114. Accordingly, the memory 212 is connected to and accessible by the controller 210 through electrical connection 242. The memory 212 may be a volatile memory and/or a non-volatile memory. For example, memory 212 can include, but is not limited to, a Random Access Memory ("RAM"), a Dynamic RAM ("DRAM"), a Read Only Memory ("ROM") and a flash memory. The memory 212 may also comprise unsecure memory and/or secure memory. The memory 212 can be used to store various types of data 260 therein, such as authentication information, cryptographic information, location information, network configuration data and various other information.

One or more sets of instructions 250 are stored in memory 212. The instructions may include customizable instructions and non-customizable instructions. The instructions 250 can also reside, completely or at least partially, within the controller 210 during execution thereof by mobile device 114. In this regard, the memory 212 and the controller 210 can constitute machine-readable media. The term "machine-readable media", as used herein, refers to a single medium or multiple media that stores one or more sets of instructions 250. The term "machine-readable media", as used here, also refers to any medium that is capable of storing, encoding or carrying the set of instructions 250 for execution by the mobile device 114 and that causes the mobile device 114 to perform one or more of the methodologies of the present disclosure.

The controller 210 is also connected to a user interface 230. The user interface 230 comprises input devices 216, output devices 224 and software routines (not shown in FIG. 2) configured to allow a user to interact with and control software applications (e.g., software applications 254 and other software applications) installed on the mobile device 114. Such input and output devices may include, but are not limited to, a display 228, a speaker 226, a Light Emitting Diode ("LED") 280, a flash device 282, a keypad 220, a directional pad (not shown in FIG. 2), a directional knob (not shown in FIG. 2), a microphone 422, and/or a camera 218. The display 228 may be designed to accept touch screen inputs. As such, user interface 230 can facilitate a user software interaction for launching applications (e.g., software application 254 and other software applications) installed on the mobile device 114. The user interface 230 can facilitate a user-software interactive session for: initiating communications with an external device; writing data to and reading data from memory 212; and/or initiating a programming, configuration and/or provisioning process for an electronic device with an optical input means (e.g., traffic monitoring system 102 of FIG. 1).

The display 228, keypad 220, directional pad (not shown in FIG. 2) and directional knob (not shown in FIG. 2) can collectively provide a user with a means to initiate one or more software applications or functions of the mobile device 114. The application software 254 can facilitate the data exchange (a) a user and the mobile device 114, (b) the mobile device 114 and an enterprise system (e.g., enterprise system 106 of FIG. 1) via a network (e.g., network 104 of FIG. 1), and/or (c) the mobile device 114 and a traffic monitoring system (e.g., traffic monitoring system 102 of FIG. 1) via a sequence of flashes generated by flash device 282 or a sequence of high-contrast display patterns (e.g., black, white and/or red display patterns, or grayscale patterns) output from display 228. In this regard, the application software 254 performs one or more of the following: verify the identity of a user of mobile device 114 via an authentication process; present information to the user indicating this his/her identity has or has not been verified; and/or present a Graphical User Interface ("GUI") to the user for enabling the user to initiate and track the progress of a programming/configuration/provisioning process.

Figure 3:
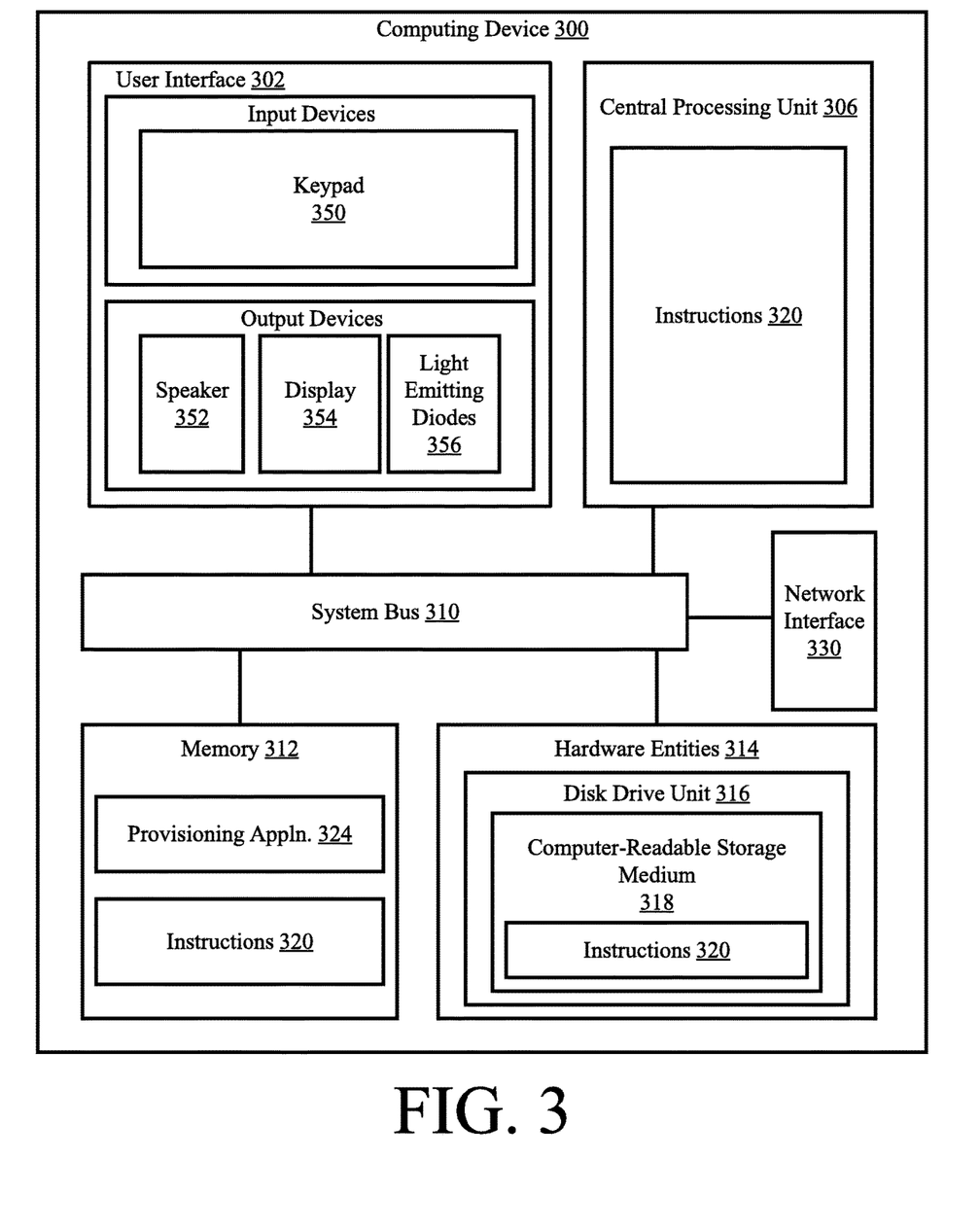
FIG. 3 is a block diagram showing an illustrative architecture for a computing device.

Referring now to FIG. 3, there is provided a detailed block diagram of an illustrative architecture for a computing device 300. Computing device 118 and/or computing device 130 of FIG. 1 is(are) the same as or similar to computing device 300. Accordingly, the discussion of computing device 300 is sufficient for understanding computing devices 118, 130 of FIG. 1.

Computing device 300 may include more or less components than those shown in FIG. 3. However, the components shown are sufficient to disclose an illustrative embodiment implementing the present solution. The hardware architecture of FIG. 3 represents one illustrative architecture for a computing device 300 configured to facilitate optical device configuration. As such, the computing device 300 of FIG. 3 implements at least a portion of the present solution discussed herein. Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or LEDs 356), which facilitate user-software interactions for controlling operations of the computing device 300.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating programming/configuration/provisioning of electronic devices via an optical means. In this regard, it should be understood that the electronic circuit can access and run a provisioning application 324 installed on the computing device 300. The software application 324 is generally operative to facilitate: the retrieval of network configuration data (e.g., network configuration data 134 of FIG. 1) from a datastore (e.g., datastore 132 of FIG. 1); the communication of the network configuration data to a remote device (e.g., mobile device 114 of FIGS. 1-2); and/or an establishment of a network connection with a remote traffic monitoring system (e.g., traffic monitoring system 102 of FIG. 1) or other device. Other functions of the software application 324 will become apparent as the discussion progresses.

The computing device 300 also comprises a network interface 330. The network interface 330 facilitates communications with remote devices via a network (e.g., network 106 of FIG. 1). The network 104 can include, but is not limited to, the Internet, an Intranet, and/or a cellular network.

Figure 4:
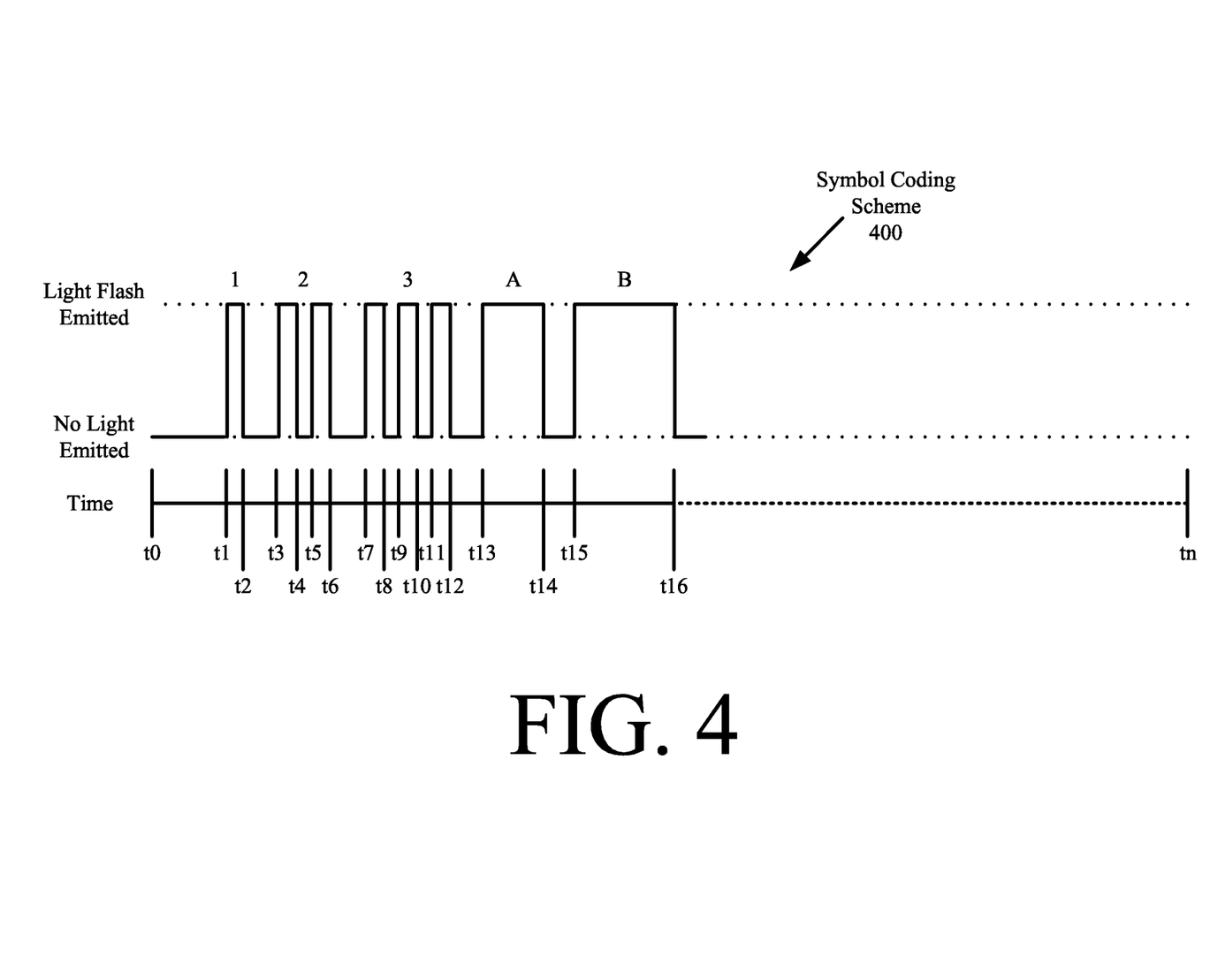
FIG. 4 provides an illustration that is useful for understanding an illustrative symbol coding scheme.

Referring now to FIG. 4, there is provided an illustration that is useful for understanding how network configuration data is communicated from the mobile device 114 to the traffic monitoring system 102. In some scenarios, the flash device 282 is used for communicating the network configuration data from the mobile device 114. Accordingly, the flash device 282 is controlled by controller 210 such that it generates a sequence of flashes in accordance with a symbol coding scheme in which letters, numbers and/or other symbols are represented by combinations of long and/or short signals of light.

One illustrative symbol coding scheme 400 is shown in FIG. 4. In accordance with the symbol coding scheme 400, each integer number is represented by a series of short pulses, where the series includes a respective number of short pulses. For example, the number one is represented by a single short pulse, while the number two is represented by two consecutive short pulses and the number three is represented by three consecutive short pulses that are equally spaced apart. Each letter is represented by a series of long pulses, where the series includes a respective number of long pulses. For example, the letter A is represented by a single long pulse having a given time duration t14-t13, and the letter B is represented by a single long pulse having a time duration t16-t15 longer than duration t14-t13. The present solution is not limited to the particulars of these examples. Any numeral system and/or language system can be used herein without limitation.

Figure 5:
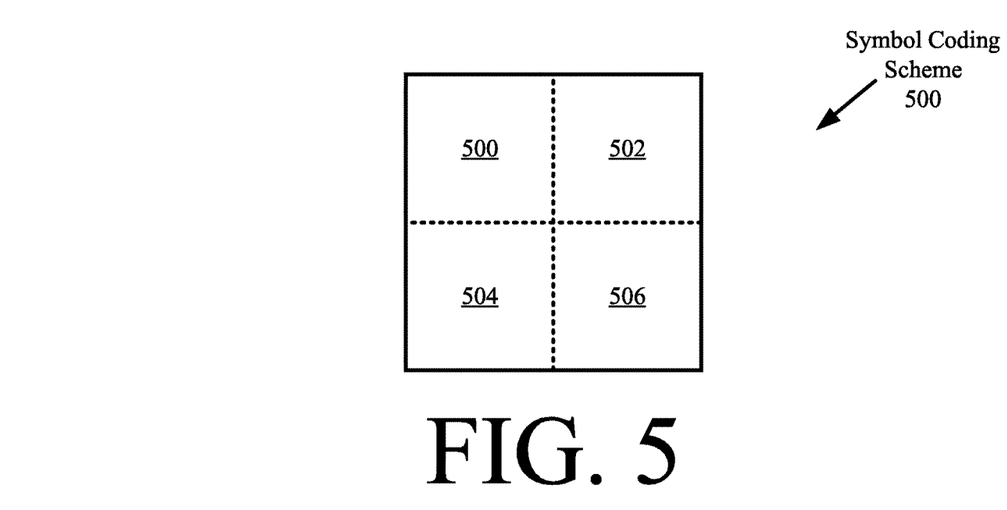
FIGS. 5-6 provides illustrations that are useful for understanding another illustrative symbol coding scheme.
Figure 6:
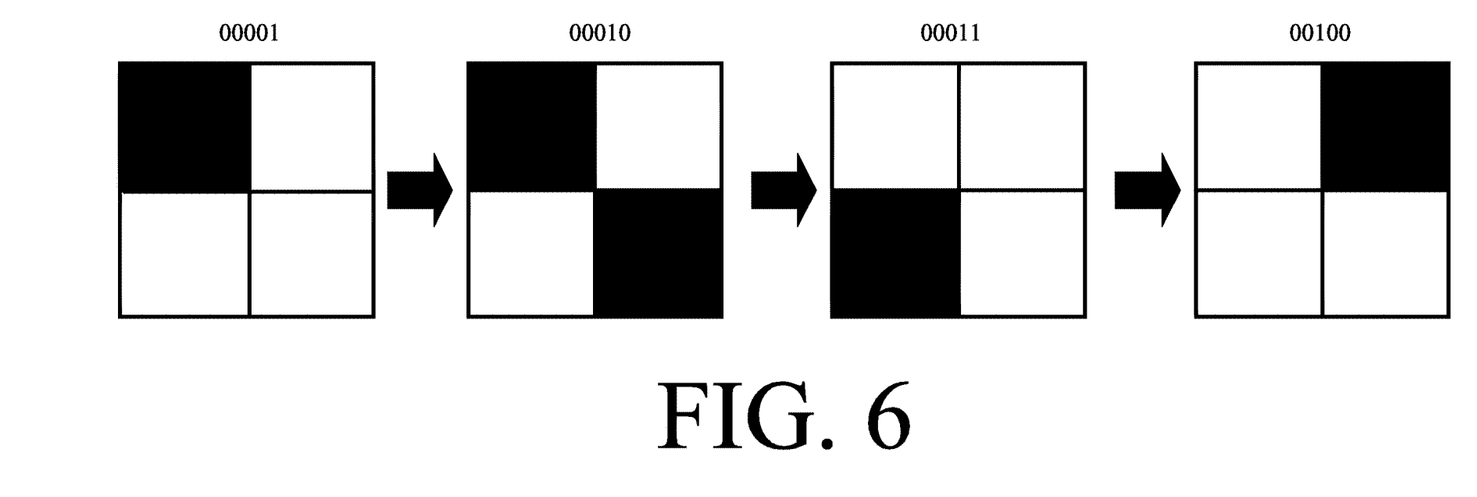

Referring now to FIGS. 5-6, there are provided illustrations that are useful for understanding how network configuration data is communicated from the mobile device 114 to the traffic monitoring system 102. In some scenarios, the display 228 is used for communicating the network configuration data from the mobile device 114. Accordingly, the display 228 is controlled by controller 210 such that it presents a sequence of high control images in accordance with a symbol coding scheme in which letters, numbers and/or other symbols are represented by combinations of colored shapes (e.g., black, white and/or red blocks).

One illustrative symbol coding scheme 500 is shown in FIGS. 5-6. In accordance with the symbol coding scheme 500, each binary number is represented by a display pattern of colored shapes, where the display pattern includes a respective number of dark colored shapes and a respective number of light colored shapes. For example, the binary number 00001 is represented by a display pattern including a dark colored block in the top left corner 500 and light colored blocks in the top right corner 502, bottom left corner 504 and bottom right corner 506. In contrast, the binary number 00010 is represented by a display pattern including dark colored blocks in the top left corner 500 and bottom right corner 506, and light colored blocks in the top right corner 502 and bottom left corner 504. The present solution is not limited to the particulars of this example. Any numeral system and/or language system can be used herein. Also, any shape and/or number of shapes in a display pattern can be employed herein.

Figure 7A:
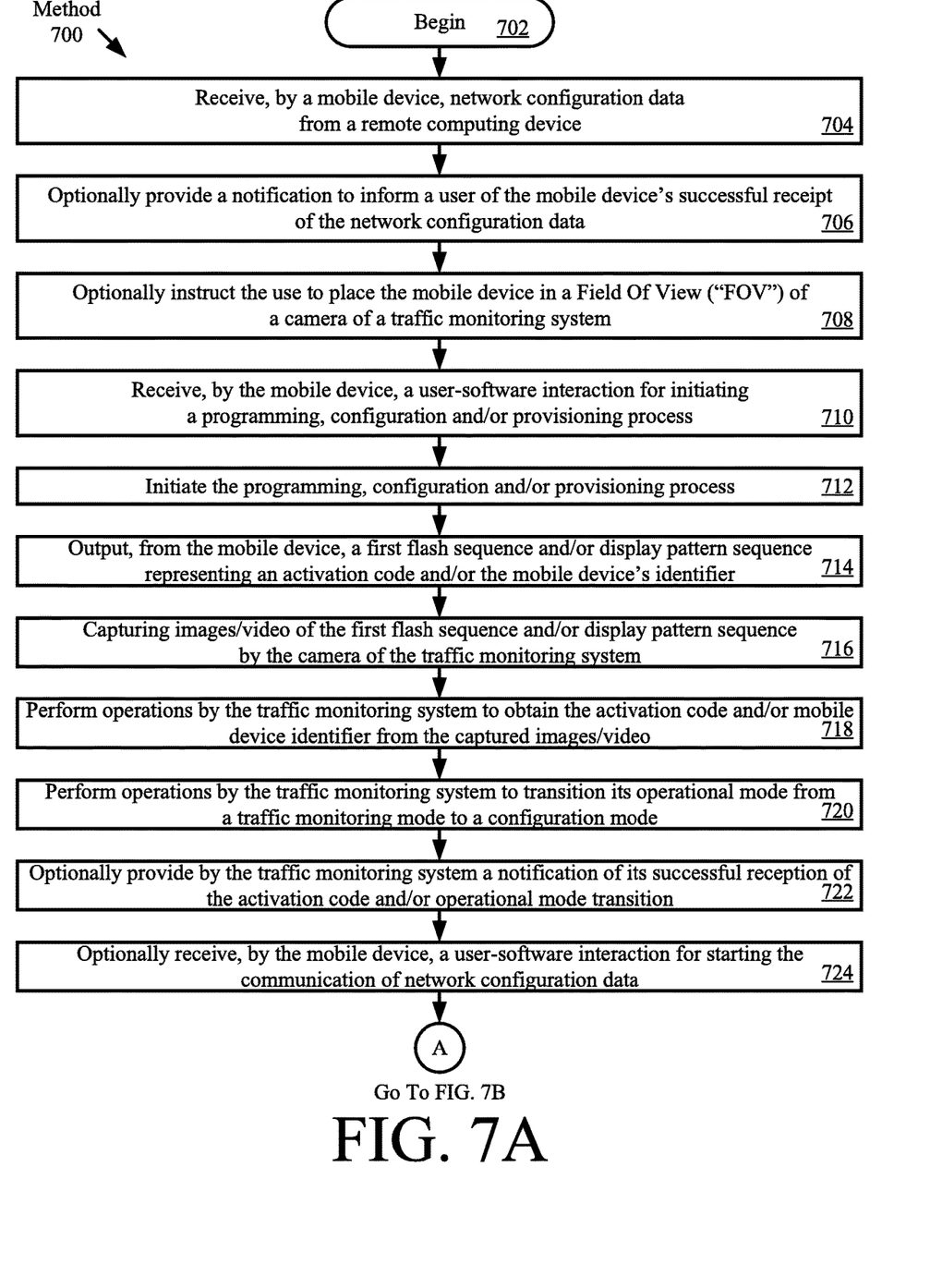
FIGS. 7A-7B (collectively referred to as "FIG. 7") provides a flow diagram of an illustrative method for optical device configuration.

Referring now to FIG. 7, there is provided a flow diagram of an illustrative method 700 for optical device configuration. Method 700 begins with 702 and continues with 704 where a mobile device (e.g., mobile device 114 of FIGS. 1-2) receives network configuration data (e.g., network configuration data 134 of FIG. 1) from a remote computing device (e.g., computing device 130 of FIG. 1). The mobile device is located in a RSF (e.g., RSF 150 of FIG. 1), while the remote computing device is part of an enterprise system (e.g., enterprise system 106 of FIG. 1). The enterprise system can be part of the same or different business organization as that to which the RSF belongs.

Next in 706-708, the mobile device optionally provides its user a notification of its successful receipt of the network configuration data, and/or optionally provides instructions to its user to place the mobile device in a FOV of a camera (e.g., camera 116 of FIG. 1) of a traffic monitoring system (e.g., traffic monitoring system 102 of FIG. 1). The notification and/or instructions can be presented in a display GUI of the mobile device.

In 710, the mobile device receives a user-software interaction for initiating a programming, configuration and/or provisioning process. The user-software interaction is achieved using a keypad (e.g., keypad 220 of FIG. 2), a touch screen (e.g., display 228 of FIG. 2), and/or a microphone (e.g., microphone 222 of FIG. 2) of the mobile device. In response to the user-software interaction, the programming, configuration and/or provisioning process is initiated in 712. As shown by 714, this process involves: outputting from the mobile device a first flash sequence (e.g., the flash sequence shown in FIG. 4) and/or display pattern sequence (e.g., the display pattern sequence shown in FIG. 6) representing an activation code and/or the mobile device's identifier. The activation code includes one or more numbers, letters, and/or other symbols. The mobile device's identifier can include, but is not limited to, a Media Access Control ("MAC") address, IP address or other network address.

At the traffic monitoring system, various operations are performed in 716-720. 716-720 involve: capturing images or video of the first flash sequence and/or display pattern sequence; processing the images or video to obtain the activation code and/or mobile device's identifier therefrom; and transitioning operational modes in response to the activation code and/or mobile device identifier. The operational modes can include, but are not limited to, a traffic monitoring mode and a calibration mode. In the traffic monitoring mode, the traffic monitoring system performs operations to measure traffic in the RSF and/or analyze the traffic measurements. The traffic measurement analysis can involve identifying times when traffic peaks, determining an accurate rate of conversion, optimizing resource allocation, and/or determining a marketing campaigns performance. In the calibration mode, the traffic monitoring system performs operations to receive network configuration data, store the network configuration data in memory (e.g., memory 120 of FIG. 1), and use the network configuration data to establish a network connection with an external system (e.g., the enterprise system 106 of FIG. 1).

The activation code and/or mobile device identifier is obtained from the images or video by (a) detecting flashes therein, (b) determining the duration of the detected flashes, (c) determining the timing between adjacent ones of the detected flashes, (d) identifying single flashes and/or sets of flashes based on the timing determined in (c), and/or (e) comparing the results of (a)-(d) to pre-defined rules implementing a flash sequence chart for translating from a symbol coding scheme (e.g., Morse code) to textual information, numerical information and/or symbolic information. The flash sequence chart can include, but is not limited to, a Morse code chart or a chart defining another symbol coding scheme (e.g., such as the symbol coding scheme 400 of FIG. 4). Adjacent single flashes and/or sets of flashes can be separated from each other by a defined period of time (e.g., 1-5 seconds) in which no flash occurs.

Alternatively or additionally, the activation code is obtained from the images or video by (a) detecting display patterns therein, (b) identifying single display patterns and/or sets of display patterns, and/or (c) comparing the results of (a)-(b) to pre-defined rules implementing a display pattern chart for translating from a symbol coding scheme to textual information, numerical information and/or symbolic information. Adjacent single display patterns and/or sets of display patterns can be separated from each other by a single colored display pattern (e.g., a display pattern that is entirely white or black).

Upon completing 720, method 700 continues with 722. In 722, the traffic monitoring system optionally provides a notification of its successful reception of the activation code. This notification can be a visual notification and/or an auditory notification. The visual notification can be provided using an LED (e.g., LED 115 of FIG. 1). For example, green light is emitted from the LED continuously or in a blinking manner for a given period of time when the traffic monitoring system successfully received the activation code. Otherwise, red light is emitted from the LED continuously or in a blinking manner for a given period of time. The present solution is not limited to the particulars of this example.

Figure 7B:
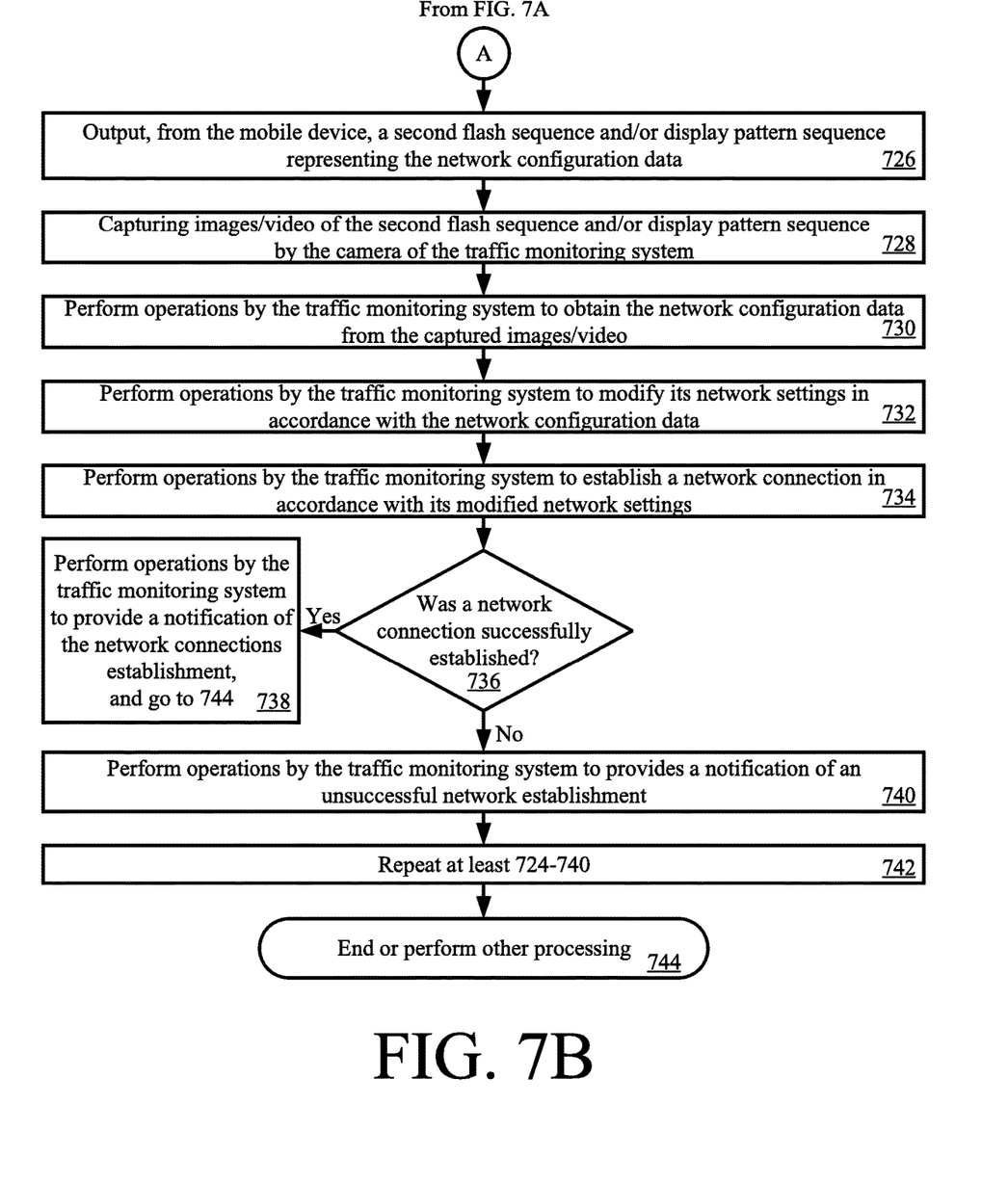

In 724, the mobile device optionally receives a user-software interaction for starting a communication of the network configuration data therefrom. The user-software interaction is achieved using a keypad (e.g., keypad 220 of FIG. 2), a touch screen (e.g., display 228 of FIG. 2), and/or a microphone (e.g., microphone 222 of FIG. 2) of the mobile device. In response to the user-software interaction of 724 or automatically when certain criteria is met (e.g., a given period of time has expired since the mobile device's communication of the activation code therefrom), method 700 continues with 726 of FIG. 7B.

As shown in FIG. 7B, 726 involves outputting from the mobile device a second flash sequence and/or display pattern sequence representing the network configuration data. The network configuration data includes one or more numbers, letters, and/or other symbols.

At the traffic monitoring system, various operations are performed in 728-732. 728-732 involve: capturing images or video of the second flash sequence and/or display pattern sequence; processing the images or video to obtain the network configuration data therefrom; and modifying its network settings in accordance with the network configuration data. The network settings are modified by writing over locally stored network configuration data (e.g., network configuration data 126 of FIG. 1) with the network configuration data obtained from the images or video to network configuration data.

Once the network settings have been modified, the traffic monitoring system performs operations attempting to establish a network connection with the external device, as shown by 734. Techniques for establishing network connections are well known in the art, and therefore will not be described herein. Any known or to be known method for establishing a network connection can be used herein in accordance with a given application.

If the network connection was successfully established [736:YES], then 738 is performed where the traffic monitoring system provides a notification of the successfully established network connection. This notification can be a visual notification and/or an auditory notification. The visual notification can be provided using an LED (e.g., LED 115 of FIG. 1). For example, green light is emitted from the LED continuously or in a blinking manner for a given period of time when the network connection has been successfully established. The present solution is not limited to the particulars of this example. Method 700 then goes to 744 where it ends or other processing is performed (e.g., return to 702 of FIG. 7A).

If the network connection was not successfully established [736:N0], then 740 is performed where the traffic monitoring system provides a notification of an unsuccessful network establishment. This notification can be a visual notification and/or an auditory notification. The visual notification can be provided using an LED (e.g., LED 115 of FIG. 1). For example, red light is emitted from the LED continuously or in a blinking manner for a given period of time when the network connection has been unsuccessfully established. The present solution is not limited to the particulars of this example. Method 700 then repeats at least 724-740, as shown by 742. Subsequently, 744 is performed where method 700 ends or other processing is performed (e.g., return to 702 of FIG. 7A).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for optical device configuration, comprising:
wirelessly receiving, by a mobile device, network configuration data for an electronic device that is at least partially out of reach to individuals without use of a climbable object, has an optical input device, and needs to have a network connection established;
outputting from the mobile device a first image sequence representing an activation code;
receiving the activation code at the electronic device via the optical input device; performing operations by the electronic device to transition an operational mode to a configuration mode in response to the activation code;
outputting from the mobile device a second image sequence representing network configuration data for the electronic device;
receiving the network configuration data at the electronic device via the optical input device; and
modifying, by the electronic device, network settings in accordance with the network configuration data,
wherein the electronic device comprises a traffic monitoring system.

2. The method according to claim 1, wherein the first or second image sequence comprises at least one of a flash sequence or a display pattern sequence.

3. The method according to claim 1, wherein the first image sequence further represents an identifier of the mobile device, and the operational mode of the electronic device is transitioned based further on the identifier of the mobile device.

4. The method according to claim 1, further comprising attempting to establish a network connection by the electronic device using the modified network settings.

5. The method according to claim 4, further comprising providing a notification when the network connection is successfully established.

6. The method according to claim 1, wherein the optical input device comprises a camera.

7. The method according to claim 6, further comprising capturing, by the camera, first images or video of the first image sequence and second images or video of the second image sequences.

8. The method according to claim 7, further comprising performing image or video analysis to obtain the activation code from the first captured images or video and to obtain the network configuration data from the second images or video.

9. The method according to claim 8, wherein the image or video analysis comprises translating from one or more symbol coding schemes to textual information, numerical information and/or symbolic information.

10. A system, comprising:
a processor; and
a non-transitory computer-readable storage medium comprising programming instructions that are configured to cause the processor to implement a method for optical device configuration, wherein the programming instructions comprise instructions to cause a mobile device to:
wirelessly receive network configuration data for an electronic device that is at least partially out of reach to individuals without use of a climbable object, has an optical input device, and needs to have a network connection established;
output a first image sequence representing an activation code for causing the electronic device to transition an operational mode to a configuration mode; and
output a second image sequence representing network configuration data based on which network settings of the electronic device are to be modified,
wherein the electronic device comprises a traffic monitoring system.

11. The system according to claim 10, wherein the first or second image sequence comprises at least one of a flash sequence or a display pattern sequence.

12. The system according to claim 10, wherein the first image sequence further represents an identifier of a mobile device, and the operational mode of the electronic device is transitioned based further on the identifier of the mobile device.

13. The system according to claim 10, wherein the modified network settings are used by the electronic device to attempt to establish a network connection.

14. The system according to claim 13, wherein the programming instructions further comprise instructions to cause the second image sequence to be output once again when the network connection is not successfully established by the electronic device.

15. A system, comprising:
a processor; and
a non-transitory computer-readable storage medium comprising programming instructions that are configured to cause the processor to implement a method for optical device configuration associated with an electronic device that is at least partially out of reach to individuals without use of a climbable object, has an optical input device and needs to have a network connection established, wherein the programming instructions comprise instructions to cause the electronic device to:
wirelessly receive a first image sequence representing an activation code via the optical input device;
transition an operational mode to a configuration mode in response to the activation code;
receive a second image sequence representing network configuration data via the optical input device;
modify network settings in accordance with the network configuration data; and
attempt to establish the network connection in accordance with the modified network settings,
wherein the electronic device comprises a traffic monitoring system.

16. The system according to claim 15, wherein the programming instructions further comprise instructions to provide a notification indicating whether or not the network connection was successfully established.

17. The system according to claim 15, wherein the optical input device comprises a camera.

18. The system according to claim 17, wherein the programming instructions further comprise instructions to capture, by the camera, first images or video of the first image sequence and second images or video of the second image sequences.

19. The system according to claim 18, wherein the programming instructions further comprise instructions to perform image or video analysis to obtain the activation code from the first captured images or video and to obtain the network configuration data from the second images or video.

20. The system according to claim 19, wherein the image or video analysis comprises translating from one or more symbol coding schemes to textual information, numerical information and/or symbolic information.

21. The method according to claim 1, wherein the outputting from the mobile device the second image sequence comprises a display of the mobile device displaying the second image sequence.

* * * * *